(12) United States Patent
Chang

(10) Patent No.: US 11,775,077 B2
(45) Date of Patent: Oct. 3, 2023

(54) METHOD FOR ACTIVATING SYSTEM FUNCTION IN RESPONSE TO TRIGGERED ICON ON HAND OBJECT, HOST, AND COMPUTER READABLE STORAGE MEDIUM

(71) Applicant: HTC Corporation, Taoyuan (TW)

(72) Inventor: Yi-Hsin Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/749,171

(22) Filed: May 20, 2022

(65) Prior Publication Data

US 2023/0176657 A1 Jun. 8, 2023

Related U.S. Application Data

(60) Provisional application No. 63/285,491, filed on Dec. 3, 2021.

(51) Int. Cl.
*G06T 11/00* (2006.01)
*G06F 3/01* (2006.01)
*G06F 3/04817* (2022.01)

(52) U.S. Cl.
CPC .......... *G06F 3/017* (2013.01); *G06F 3/04817* (2013.01); *G06T 11/00* (2013.01)

(58) Field of Classification Search
CPC ....... G06F 3/017; G06F 3/04817; G06T 11/00
See application file for complete search history.

(56) References Cited

U.S. PATENT DOCUMENTS

| 10,990,240 B1* | 4/2021 | Ravasz | G06F 3/011 |
| 2010/0321377 A1* | 12/2010 | Gay | G06T 11/00 345/419 |
| 2012/0113223 A1* | 5/2012 | Hilliges | G06F 3/011 348/46 |
| 2015/0033174 A1* | 1/2015 | Hisatsugu | B60K 35/00 715/771 |
| 2015/0248170 A1 | 9/2015 | Abovitz et al. | |

(Continued)

FOREIGN PATENT DOCUMENTS

| CN | 107272879 | 10/2017 |
| TW | 201727439 | 8/2017 |

(Continued)

OTHER PUBLICATIONS

"Office Action of Taiwan Counterpart Application", dated Jan. 10, 2023, p. 1-p. 12.

*Primary Examiner* — Rinna Yi
(74) *Attorney, Agent, or Firm* — JCIPRNET

(57) ABSTRACT

The embodiments of the disclosure provide a method for activating a system function, a host, and a computer readable storage medium. The method includes: tracking a hand gesture and accordingly rendering a hand object in a visual content, wherein the hand object comprises one or more finger object; in response to determining that the hand gesture satisfies a predetermined condition, showing at least one icon on the one or more finger object on the hand object, wherein the at least one icon respectively corresponds to at least one system function; and in response to determining that a first icon among the at least one icon is triggered, activating a first system function corresponding to the first icon.

17 Claims, 5 Drawing Sheets

(56) References Cited

U.S. PATENT DOCUMENTS

| | | | |
|---|---|---|---|
| 2015/0324001 A1* | 11/2015 | Yanai | G06T 7/70 |
| | | | 345/156 |
| 2016/0306431 A1* | 10/2016 | Stafford | G02B 27/017 |
| 2017/0017344 A1* | 1/2017 | Kuribayashi | G06F 3/04842 |
| 2019/0033975 A1 | 1/2019 | Horowitz et al. | |
| 2021/0165555 A1 | 6/2021 | Holz et al. | |
| 2022/0035508 A1* | 2/2022 | Holland | G06F 3/0421 |

FOREIGN PATENT DOCUMENTS

| | | |
|---|---|---|
| TW | 201737023 | 10/2017 |
| TW | 202016696 | 5/2020 |

\* cited by examiner

METHOD FOR ACTIVATING SYSTEM FUNCTION IN RESPONSE TO TRIGGERED ICON ON HAND OBJECT, HOST, AND COMPUTER READABLE STORAGE MEDIUM

CROSS-REFERENCE TO RELATED APPLICATION

This application claims the priority benefit of U.S. provisional application Ser. No. 63/285,491, filed on Dec. 3, 2021. The entirety of the above-mentioned patent application is hereby incorporated by reference herein and made a part of this specification.

BACKGROUND

1. Field of the Invention

The present disclosure generally relates to a method for activating a system function, a host, and a computer readable storage medium.

2. Description of Related Art

The virtual reality (VR) space is not as good as 2D media with a fixed location for displaying the system's menu, and the gesture operation lacks dedicated buttons like the physical controller system, so the need to operate the existing VR content by the most recognizable pinch motion is quite limited. In addition, it is also difficult for users to learn multiple gestures and memorize their functions.

SUMMARY OF THE INVENTION

Accordingly, the disclosure is directed to a method for activating a system function, a host, and a computer readable storage medium, which may be used to solve the above technical problems.

The embodiments of the disclosure provide a method for activating a system function, adapted to a host. The method includes: tracking a hand gesture and accordingly rendering a hand object in a visual content, wherein the hand object comprises one or more finger object; in response to determining that the hand gesture satisfies a predetermined condition, showing at least one icon on the one or more finger object on the hand object, wherein the at least one icon respectively corresponds to at least one system function; and in response to determining that a first icon among the at least one icon is triggered, activating a first system function corresponding to the first icon.

The embodiments of the disclosure provide a host including a storage circuit and a processor. The storage circuit stores a program code. The processor is coupled to the non-transitory storage circuit and accesses the program code to perform: tracking a hand gesture and accordingly rendering a hand object in a visual content, wherein the hand object comprises one or more finger object; in response to determining that the hand gesture satisfies a predetermined condition, showing at least one icon on the one or more finger object on the hand object, wherein the at least one icon respectively corresponds to at least one system function; and in response to determining that a first icon among the at least one icon is triggered, activating a first system function corresponding to the first icon.

The embodiments of the disclosure provide a non-transitory computer readable storage medium, the computer readable storage medium recording an executable computer program, the executable computer program being loaded by a host to perform steps of: tracking a hand gesture and accordingly rendering a hand object in a visual content, wherein the hand object comprises one or more finger object; in response to determining that the hand gesture satisfies a predetermined condition, showing at least one icon on the one or more finger object on the hand object, wherein the at least one icon respectively corresponds to at least one system function; and in response to determining that a first icon among the at least one icon is triggered, activating a first system function corresponding to the first icon.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
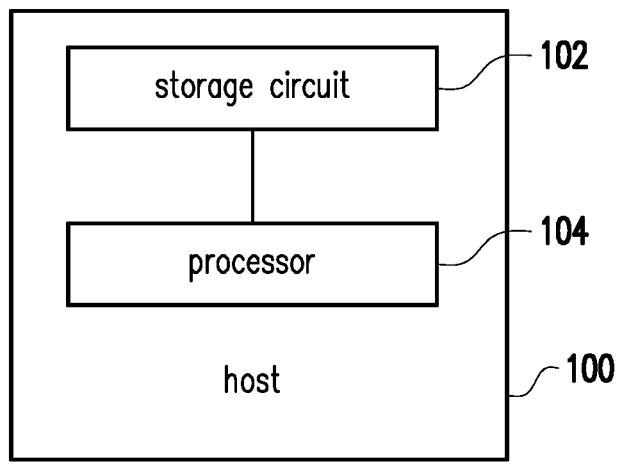
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any device capable of performing tracking functions (e.g., inside-out tracking and/or outside-in tracking) on one or more to-be-tracked objects (e.g., the hands of the user of the host 100) within the field of view (FOV) of the host 100. In the embodiments of the disclosure, the FOV can be an image-capturing range of one or more camera (e.g., tracking camera) on the host 100. When the to-be-tracked objects (e.g., the hands) is within the FOV, the cameras on the host 100 may capture images of the to-be-tracked objects, and the host 100 may track the pose of each to-be-tracked object based on the captured images, but the disclosure is not limited thereto.

In some embodiments, the host 100 can track the gesture(s) of the hand(s) in the FOV and accordingly render the corresponding hand object(s) in the provided visual content.

In the embodiments of the disclosure, the host 100 can be an HMD for providing reality services to the user thereof, wherein the reality services include, but not limited to, a virtual reality (VR) service, an augmented reality (AR) service, an extended reality (XR), and/or a mixed reality, etc. In these cases, the host 100 can show the corresponding visual contents for the user to see, such as VR/AR/XR/MR visual contents.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or program codes that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or program codes stored in the storage circuit 102 to implement the method for activating a system function provided in the disclosure, which would be further discussed in the following.

Figure 2:
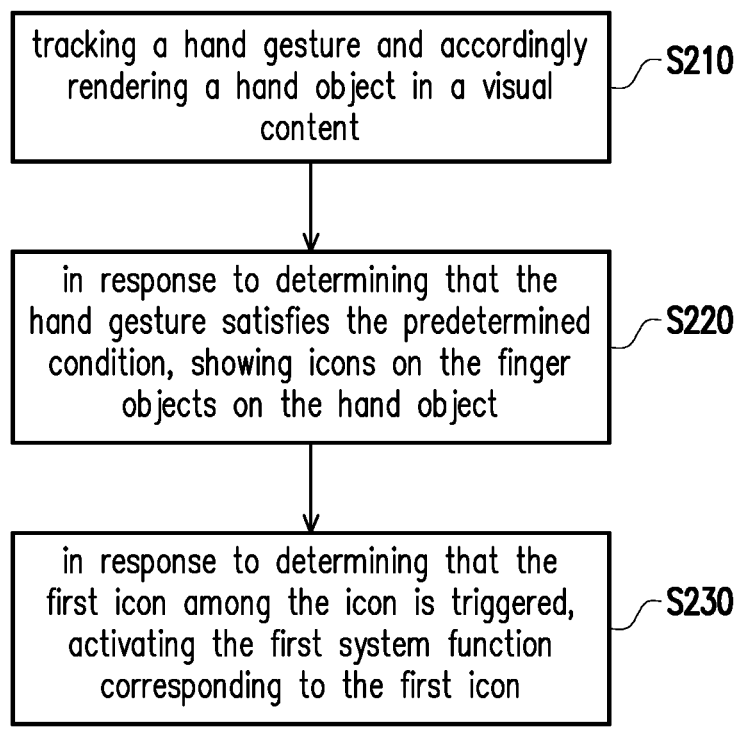
FIG. 2 shows a flow chart of the method for activating a system function according to an embodiment of the disclosure.
Figure 3:
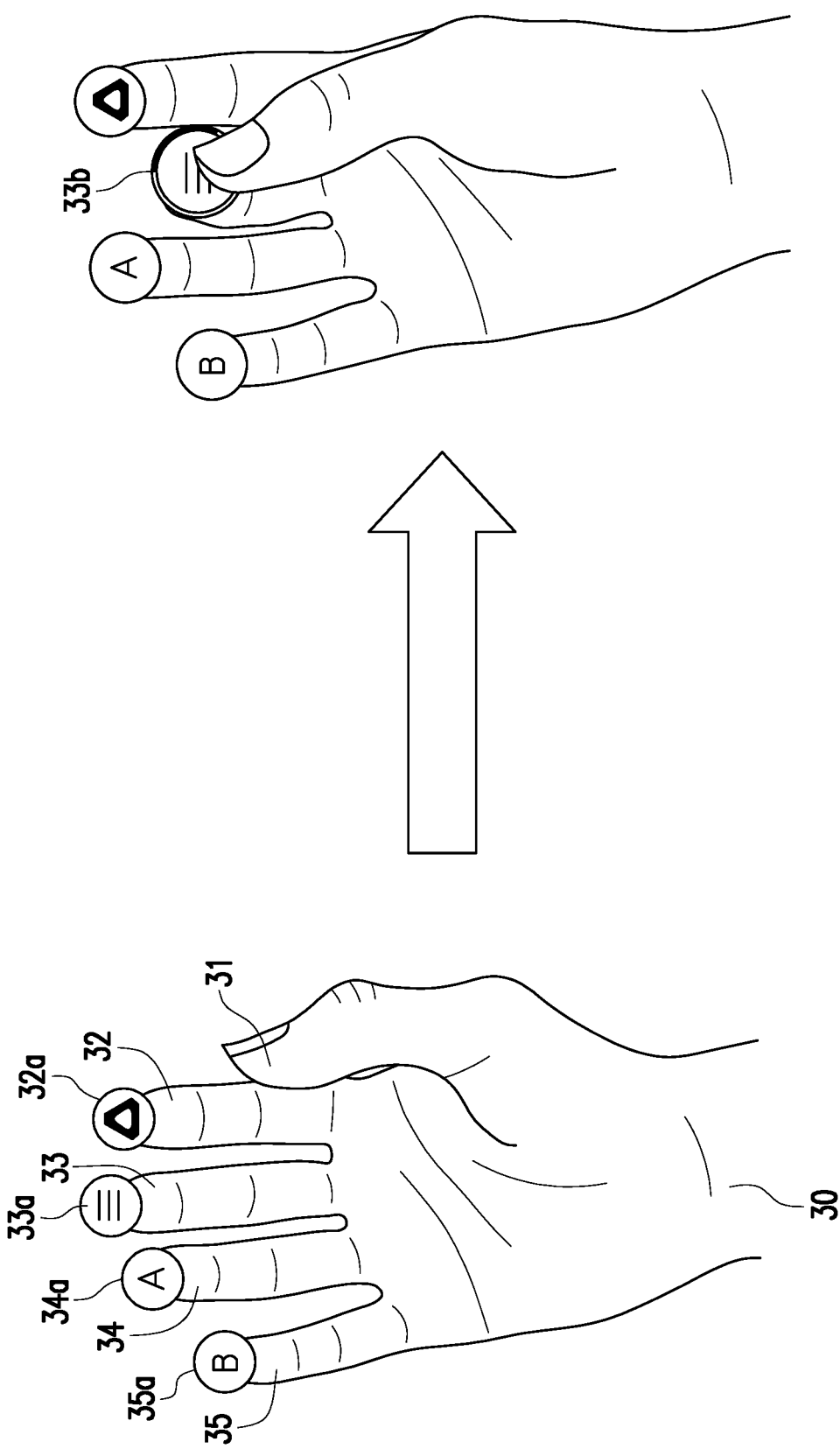
FIG. 3 shows an application scenario according to an embodiment of the disclosure.

See FIG. 2, which shows a flow chart of the method for activating a system function according to an embodiment of the disclosure. The method of this embodiment may be executed by the electronic device 100 in FIG. 1, and the details of each step in FIG. 2 will be described below with the components shown in FIG. 1. For better explaining the concept of the disclosure, FIG. 3 would be used as an illustrative example, wherein FIG. 3 shows an application scenario according to an embodiment of the disclosure.

In step S210, the processor 104 tracks a hand gesture and accordingly rendering a hand object 30 in a visual content, wherein the hand object 30 includes a reference finger object 31 and finger objects 32-35. In one embodiment, the visual content may be, for example, the VR content shown by the host 100 (e.g., an HMD) to the user thereof, but the disclosure is not limited thereto.

In one embodiment, the processor 104 may determines whether the hand gesture satisfies a predetermined condition.

Figure 4:
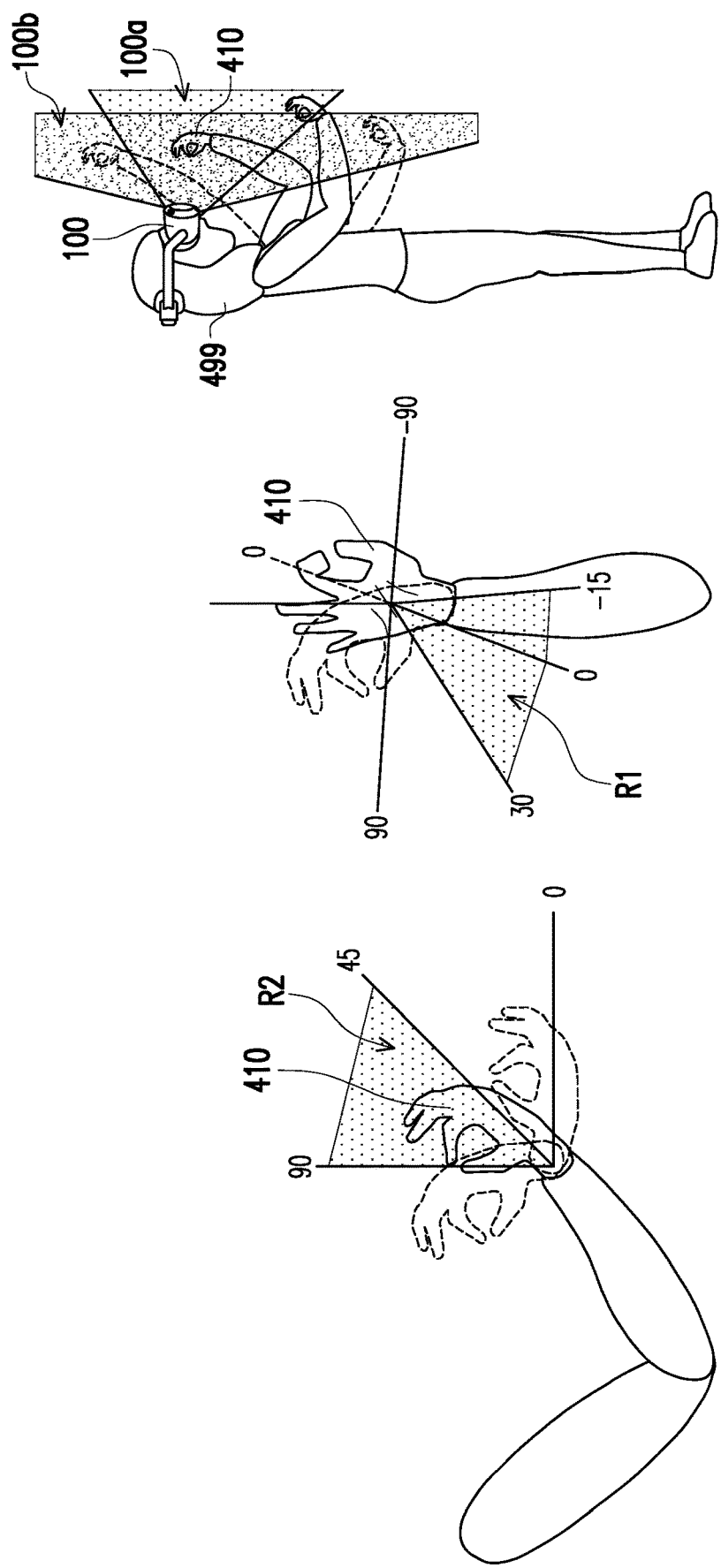
FIG. 4 shows a schematic diagram of determining whether the hand gesture satisfies the predetermined condition according to an embodiment of the disclosure.

See FIG. 4, which shows a schematic diagram of determining whether the hand gesture satisfies the predetermined condition according to an embodiment of the disclosure. In FIG. 4, it is assumed that the hand gesture 410 correspond to the hand object 30 in FIG. 3, which means that the hand object 30 is rendered based on the hand gesture 410, but the disclosure is not limited thereto.

In one embodiment, the processor 104 may determine whether an orientation of the hand gesture 410 is within a predetermined range and the hand object 30 locates within an FOV of the visual content.

In one embodiment, the processor 104 may determine whether a palm of the hand gesture 410 is substantially facing the user 499 and a wrist flexion angle of the hand gesture 410 is within an angle range R2. In one embodiment, in response to determining that the horizontal rotating angle of the wrist of the hand gesture 410 is within an angle range R1 (e.g., −15 degrees to 30 degrees shown in FIG. 4), the processor 104 may determine that the palm of the hand gesture is substantially facing the user 499. In one embodiment, in response to determining that the flexion angle of the wrist of the hand gesture 410 in within the angle range R2 (e.g., 45 degrees to 90 degrees shown in FIG. 4), the processor 104 may determine that the wrist flexion angle of the hand gesture 410 is within the angle range R2.

In one embodiment, in response to determining that the palm of the hand gesture 410 is substantially facing the user 499 and the wrist flexion angle of the hand gesture 410 is within the angle range R2, the processor 104 may determine that the orientation of the hand gesture 410 is within the predetermined range.

In one embodiment, the FOV of the visual content may be the visual range of the visual content that can be seen by the user 499 while using the host 100 (e.g., the HMD). In this case, the FOV of the visual content can be regarded as corresponding to another FOV 100a in the real world. Therefore, the case where the hand object 30 corresponding to the hand gesture 410 locates within the FOV of the visual content can be understood as the case where the hand gesture 410 locates within the FOV 100a in the real world.

In FIG. 4, the FOV 100b may be the FOV of the (tracking) camera disposed on the host 100, which is larger than the FOV 100a.

In one embodiment, when the hand gesture 410 locates within the FOV 100b but not within the FOV 100a, the processor 204 may determine that the hand object 30 does not locate within the FOV of the visual content, even though the hand gesture 410 is still trackable to the host 100, but the disclosure is not limited thereto.

In one embodiment, in response to determining that the orientation of the hand gesture 410 is within the predetermined range and the hand object 30 locates within the FOV of the visual content, the processor 204 may determine that the hand gesture 410 satisfies the predetermined condition.

On the other hand, in response to determining that the orientation of the hand gesture 410 is not within the predetermined range or the hand object 30 does not locate within the FOV of the visual content, the processor 204 may determine that the hand gesture 410 does not satisfy the predetermined condition, but the disclosure is not limited thereto.

In step S220, in response to determining that the hand gesture 410 satisfies the predetermined condition, the processor 104 shows icons 32a-35a on the finger objects 32-35 on the hand object 30.

In another embodiment, in response to determining that the hand gesture 410 does not satisfy the predetermined condition, the processor 104 can merely render the hand object 30 based on the hand gesture 410. That is, the icons 32a-35a would not be shown when the hand gesture 410 does not satisfy the predetermined condition.

In FIG. 4, the processor 104 may show the icons 32a-35a at the finger parts on the hand object 30, respectively.

In the embodiments of the disclosure, each of the icons 32a-35a can be shown at any of the finger parts (e.g., fingertips and/or knuckles) of the finger objects 32-35 on the hand object 30. In FIG. 3, the icons 32a-35a are exemplarily shown at the fingertips of the corresponding finger objects 32-35 on the hand object 30. In other embodiments, some of the 32a-35a can be shown at the knuckles of the corresponding finger objects 32-35 on the hand object 30. In another embodiment, the processor 104 could show more or less icons at the fingertips and/or knuckles of the finger objects 32-35, but the disclosure is not limited thereto.

In one embodiment, since the finger objects 32-35 may be moved along with the movement of the corresponding fingers in the hand gesture 410, the processor 104 may move the icons 32a-35a along with the corresponding finger objects 32-35.

In the embodiments of the disclosure, the icons 32a-35a respectively corresponds to system functions. For example, in FIG. 3, the icon 32a may correspond to a system function of the VR system/space/environment (e.g., the configurations thereof); the icon 33a may correspond to a system function of activating a menu of the VR system/space/environment; the icon 34a may correspond to an A button (which may be used for a particular function, such as confirming); and the icon 35a may correspond to a B button (which may be used for another particular function, such as cancelling).

In one embodiment, the system functions corresponding to the icons 32a-35a may respectively correspond to physical buttons on a handheld controller connected to the host 100.

Figure 5:
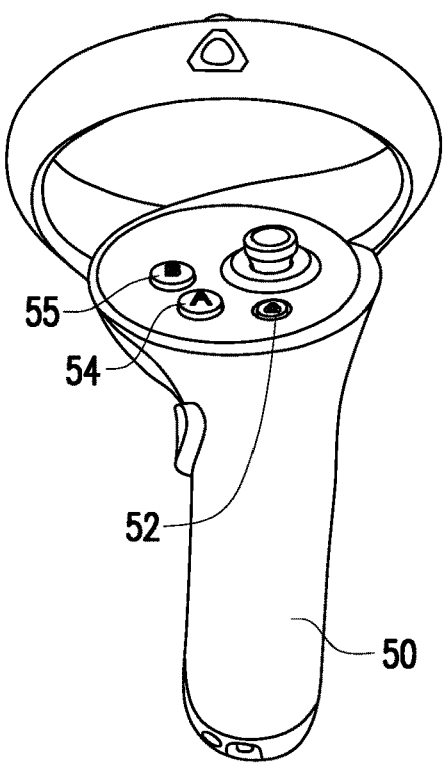
FIG. 5 shows a schematic diagram of the handheld controller according to an embodiment of the disclosure.

See FIG. 5, which shows a schematic diagram of the handheld controller according to an embodiment of the disclosure. In FIG. 5, the handheld controller 50 may be connected to the host 100, and the handheld controller 50 can be disposed with physical buttons 52, 54, and 55. In this embodiment, the system functions corresponding to the icons 32a, 34a, and 35a may respectively correspond to the physical buttons. That is, the physical buttons 52, 54, and 55 can be used to activate the system functions corresponding to the icons 32a, 34a, and 35a.

Conventionally, the user cannot hold the handheld controller 50 while interacting with the host 100 with the hand gesture 410. In this case, if the user wants to activate one of the system functions via pressing the corresponding physical button on the handheld controller 50, the user needs to reach for the handheld controller 50 without seeing the handheld controller 50 since the handheld controller 50 (and the physical buttons 52, 54, and 55) is invisible in the visual content provided by the host 100.

However, with the shown icons 32a-35a, the user may use the icons 32a-35a to activate the required system function in the case where the corresponding physical button is invisible in the visual content. Accordingly, the interaction between the user and the host 100 can be more convenient and intuitive.

In one embodiment, when the user wants to activate a first system function among the above system functions, the user may find a first icon corresponding to the first system function among the icons 32a-35a and trigger the first icon.

In step S230, in response to determining that the first icon among the icon is triggered, the processor 104 activates the first system function corresponding to the first icon.

In the embodiments of the disclosure, it is assumed that the first icon is shown at a first finger part on the hand object, the hand gesture comprises a reference finger joint and a first finger joint corresponding to the first finger part.

In one embodiment, the processor 104 may determine whether a distance between the reference finger joint and the first finger joint has been less than a distance threshold for a predetermine time length. If yes, the processor 104 may determine that the first icon shown at the first finger part is triggered; if not, the processor 104 may determine that the first icon shown at the first finger part is not triggered.

In FIG. 3, the reference finger joint may be the fingertip of the reference finger object 31 (e.g., the thumb), and the considered first icon may be the icon 33a shown at the fingertip of the finger object 33 (e.g., the middle finger). In this case, when the user wants to activate the system function corresponding to the icon 33a, the user may shorten the distance between the fingertip of the middle finger and the fingertip of the thumb on the hand gesture 410, and the distance between the fingertip of the reference finger object 31 and the fingertip of the finger object 33 would be accordingly shortened.

In one embodiment, in response to determining that the distance between the fingertip of the reference finger object 31 and the fingertip of the finger object 33 is less than the distance threshold, the processor 104 may determine that the icon 33a shown at the fingertip of the finger object 33 (i.e., the first finger part) is triggered.

In another embodiment, in response to determining that the distance between the fingertip of the reference finger object 31 and the fingertip of the finger object 33 has been less than the distance threshold for a predetermine time length (e.g., 1.5 seconds), the processor 104 may determine that the icon 33a shown at the fingertip of the finger object 33 (i.e., the first finger part) is triggered, but the disclosure is not limited thereto.

In one embodiment, in response to determining that the reference finger joint and the first finger joint collectively form a pinch motion for the predetermine time length, the processor 104 may determine that the first icon shown at the first finger part is triggered. In FIG. 3, since the processor 104 determines that the fingertip of the reference finger object 31 (i.e., the reference finger joint) and the fingertip of the finger object 33 (i.e., the fingertip of the finger object 33) have collectively formed the pinch motion, the processor 104 may determine that the icon 33a shown at the fingertip of the finger object 33 is triggered, but the disclosure is not limited thereto.

In one embodiment, in response to determining that the distance between the reference finger joint and the first finger joint is less than the distance threshold, the processor 104 may provide a notification for notifying an accumulated time of the distance being less than the distance threshold.

For example, in response to determining that the distance between the fingertip of the reference finger object 31 and the fingertip of the finger object 33 is less than the distance threshold, the processor 104 may provide a progress bar 33b surrounding the icon 33a as the notification for notifying the accumulated time of the distance being less than the distance threshold. In FIG. 4, the progress indicating line in the progress bar 33b can be gradually lengthened along with the accumulated time of the distance being less than the distance threshold. When the progress bar 33b is filled with the progress indicating line, it may represent that the accumulated time of the distance being less than the distance threshold has reached the predetermine time length, but the disclosure is not limited thereto.

In another embodiment, the notification for notifying the accumulated time of the distance being less than the distance threshold can be implemented as a sound with a gradually varying audio frequency. For example, in response to determining that the distance between the fingertip of the reference finger object 31 and the fingertip of the finger object 33 is less than the distance threshold, the processor 104 may play a sound whose audio frequency increases along with the accumulated time of the distance being less than the distance threshold. That is, the longer the accumulated time, the higher the audio frequency of the sound, but the disclosure is not limited thereto.

In one embodiment, the reference finger joint (e.g., the fingertip of the thumb on the hand gesture 410) corresponds to a reference finger part on the hand object 30 (e.g., the fingertip of the thumb on the hand object 30). In this case, the processor 104 may not show any icon at the reference finger part on the hand object (e.g., the fingertip of the thumb on the hand object 30) since the user needs to activate the required icon with the reference finger part, but the disclosure is not limited thereto.

In some embodiments, the tracking of the hand gesture 410 may be inaccurate due to some issues (e.g., occlusion), which may degrade the quality of the hand object rendered in the visual content provided by the host 100.

Figure 6:
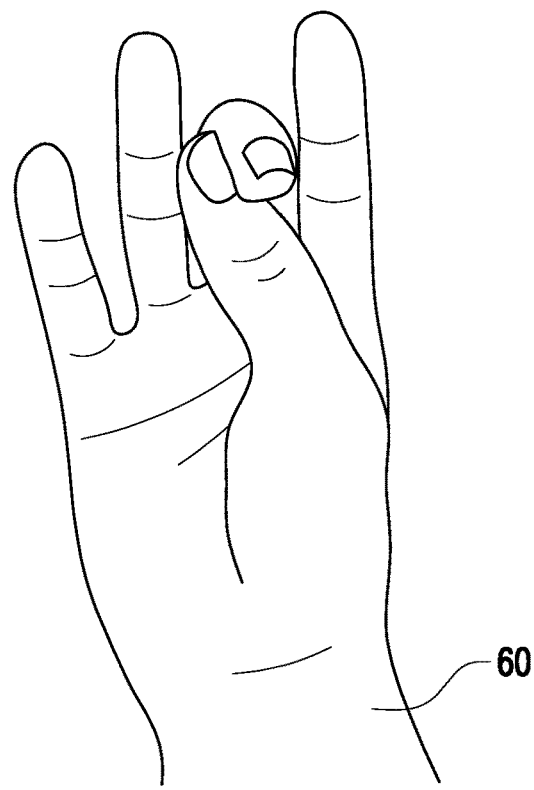
FIG. 6 shows a schematic diagram of the inaccurately rendered hand object according to FIG. 3 and FIG. 4.

See FIG. 6, which shows a schematic diagram of the inaccurately rendered hand object according to FIG. 3 and FIG. 4.

In FIG. 6, when the user 499 is performing, for example, the pinch motion shown in FIG. 3 for triggering the icon 33b, the processor 104 may not be able to accurately tracking the fingertip of the middle finger in the hand gesture 410 since the fingertip of the middle finger may be occluded by the fingertip of the thumb in the hand gesture 410. In this case, the processor 104 may determine a wrong position for the fingertip of the middle finger and accordingly render the fingertip of the middle finger in the hand object 60 at the wrong position in the visual content.

Since the distance between the fingertip of the middle finger and the fingertip of the thumb on the hand gesture 410 may be still determined to be less than the distance threshold, the processor 104 may still accumulate the time of the distance being less than the distance threshold. However, the quality of the visual content (e.g., the hand object 60 in FIG. 6) seen by the user 499 may be unsatisfying due to the inaccurately rendering situation. Therefore, the embodiments of the disclosure provide a solution for mitigating such issue.

In one embodiment, in response to determining that the distance between the reference finger joint and the first finger joint is less than the distance threshold, the processor 104 may keep the reference finger part and the first finger part together for a predetermined duration. See FIG. 7 for further discussion.

Figure 7:
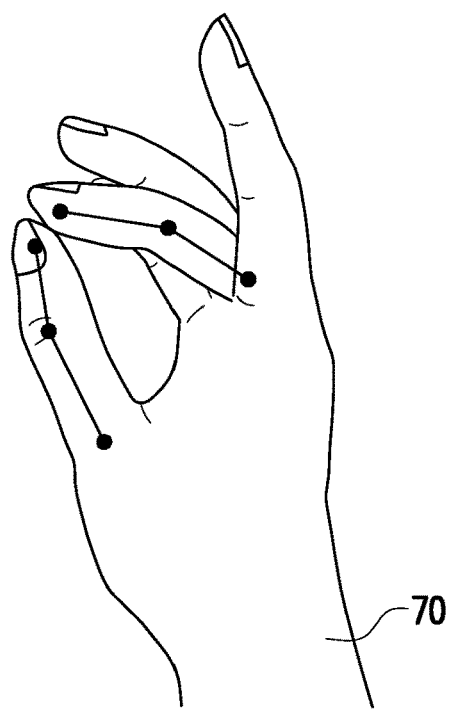
FIG. 7 shows a schematic diagram showing a better rendered hand object according to FIG. 3 and FIG. 4.

FIG. 7 shows a schematic diagram showing a better rendered hand object according to FIG. 3 and FIG. 4. Similar to the scenario in FIG. 3 and FIG. 4, it is assumed in FIG. 7 that the reference finger part is the fingertip of the thumb in the hand object 70 and the first finger part is the fingertip of the middle finger in the hand object 70.

In the present embodiment, in response to determining that the distance between the fingertip of the thumb in the hand gesture (i.e., the reference finger joint) and the fingertip of the middle finger in the hand gesture (i.e., the first finger joint) is less than the distance threshold, the processor 104 may keep the fingertip of the thumb in the hand object 70 (i.e., the reference finger part) and the fingertip of the middle finger in the hand object 70 (i.e., the first finger part) together for a predetermined duration.

In some embodiment, the length of the predetermined duration may be equal to the predetermined time length, but the disclosure is not limited thereto.

In this case, even though the tracking for the fingertip of the middle finger in the hand gesture may still be inaccurate during the pinch motion, the visual content seen by the user 499 may be stabilized/maintained to show a reasonable appearance of the hand object 70, instead of showing an unsatisfying visual content (e.g., the hand object 60 in FIG. 6) due to the inaccurate tracking.

In one embodiment, the appearance and/or the system function of the shown icon can be customized in the application providing the visual content. In one embodiment, the processor 104 may determines whether the application providing the visual content is designed with one or more specific system function corresponding to the icon(s). If yes, the processor 104 may determine the one or more specific system function to be the system function(s) corresponding to the icon(s). See FIG. 8 for further discussions.

Figure 8:
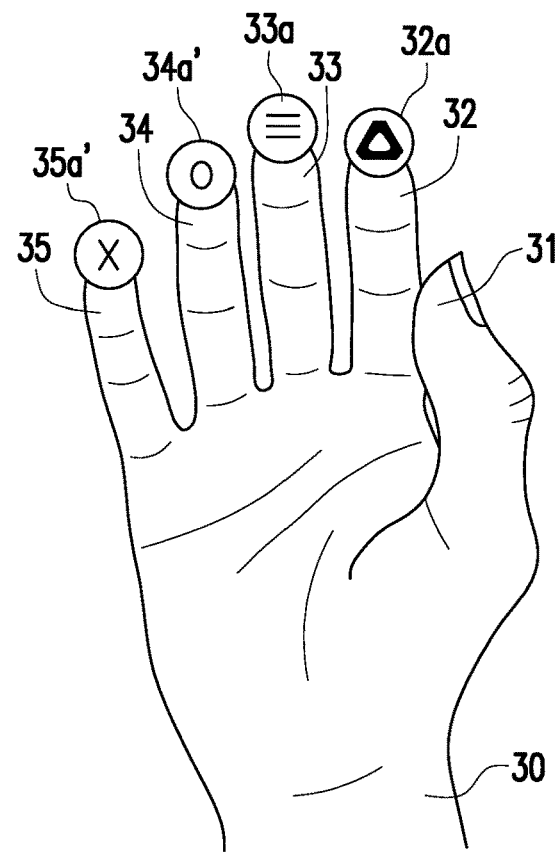
FIG. 8 shows a schematic diagram of some customized icons according to FIG. 3.

FIG. 8 shows a schematic diagram of some customized icons according to FIG. 3. In FIG. 8, the application can be designed with one or more specific functions corresponding to one or more of the icons. For example, the application can be designed with two system functions and appearances for the icons 34a' and 35a' corresponding to the finger objects 34 and 35. For example, the appearances of the icons 34a' and 35a' corresponding to the finger objects 34 and 35 can be designed as a circle and a cross, and the corresponding system function may be, for example, confirming and cancelling, respectively.

Accordingly, the processor 104 may show the appearances of the icons 34a' and 35a' as a circle and a cross, respectively. In one embodiment, if the user performs a pinch motion with the reference finger object 31 and the finger object 34, the system function of, for example, confirming can be activated. In another embodiment, if the user performs a pinch motion with the reference finger object 31 and the finger object 35, the system function of, for example, cancelling can be activated, but the disclosure is not limited thereto.

In another embodiment, in response to determining that the application providing the visual content is not designed with any specific system function corresponding to the icon, the processor 104 may determine at least one default system function of the host 100 to be the system function(s) corresponding to the icon(s). In the embodiment, the default system function may be the system functions exemplarily discussed in the description of FIG. 3 (i.e., the system functions corresponding to the icons 32a-35a), which would not be repeated herein.

The disclosure further provides a computer readable storage medium for executing the method for activating a system function. The computer readable storage medium is composed of a plurality of program instructions (for example, a setting program instruction and a deployment program instruction) embodied therein. These program instructions can be loaded into the host 100 and executed by the same to execute the method for activating a system function and the functions of the host 100 described above.

In summary, the embodiments of the disclosure can show some icons on the hand object when determining that the hand gesture satisfies the predetermined condition and allow the user to activate the system functions corresponding to the icons via, for example, performing a pinch motion with the corresponding fingers. Accordingly, the interaction between the user and the host can be more convenient and intuitive.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for activating a system function, adapted to a host, comprising:
    tracking a hand gesture and accordingly rendering a hand object in a visual content, wherein the hand object comprises one or more finger object;
    in response to determining that a palm of the hand gesture is substantially facing a user and a wrist flexion angle of the hand gesture is within an angle range, determining that an orientation of the hand gesture is within a predetermined range;
in response to determining that the orientation of the hand gesture is within the predetermined range and the hand object locates within a field of view of the visual content, determining that the hand gesture satisfies a predetermined condition;
in response to determining that the hand gesture satisfies the predetermined condition, showing at least one icon on the one or more finger object on the hand object, wherein the at least one icon respectively corresponds to at least one system function; and
in response to determining that a first icon among the at least one icon is triggered, activating a first system function corresponding to the first icon.

2. The method according to claim 1, further comprising:
moving the at least one icon along with the corresponding finger object.

3. The method according to claim 1, wherein the first icon is shown at a first finger part on the hand object, the hand gesture comprises a reference finger joint and a first finger joint corresponding to the first finger part, and the method comprises:
in response to determining that a distance between the reference finger joint and the first finger joint has been less than a distance threshold for a predetermine time length, determining that the first icon shown at the first finger part is triggered.

4. The method according to claim 3, comprising:
in response to determining that the distance between the reference finger joint and the first finger joint is less than the distance threshold, providing a notification for notifying an accumulated time of the distance being less than the distance threshold.

5. The method according to claim 3, wherein the reference finger joint corresponds to a reference finger part on the hand object, and the method comprises:
in response to determining that the distance between the reference finger joint and the first finger joint is less than the distance threshold, keeping the reference finger part and the first finger part together for a predetermined duration.

6. The method according to claim 1, comprising:
showing the at least one icon at one or more finger part on the hand object, respectively.

7. The method according to claim 1, wherein the at least one system function respectively corresponds to at least one physical button on a handheld controller connected to the host.

8. The method according to claim 7, wherein the at least one physical button is invisible in the visual content.

9. The method according to claim 1, further comprising:
in response to determining that an application providing the visual content is designed with at least one specific system function corresponding to the at least one icon, determining the at least one specific system function to be the at least one system function.

10. The method according to claim 9, further comprising:
in response to determining that the application providing the visual content is not designed with any specific system function corresponding to the at least one icon, determining at least one default system function of the host to be the at least one system function.

11. The method according to claim 1, further comprising:
not showing any icon at a reference finger part on the hand object.

12. The method according to claim 1, wherein the first icon is shown at a first finger part on the hand object, the hand gesture comprises a reference finger joint and a first finger joint corresponding to the first finger part, and the method comprises:
in response to determining that the reference finger joint and the first finger joint collectively form a pinch motion for a predetermine time length, determining that the first icon shown at the first finger part is triggered.

13. A host, comprising:
a non-transitory storage circuit, storing a program code;
a processor, coupled to the non-transitory storage circuit and accessing the program code to perform:
tracking a hand gesture and accordingly rendering a hand object in a visual content, wherein the hand object comprises one or more finger object;
in response to determining that a palm of the hand gesture is substantially facing a user and a wrist flexion angle of the hand gesture is within an angle range, determining that an orientation of the hand gesture is within a predetermined range;
in response to determining that the orientation of the hand gesture is within the predetermined range and the hand object locates within a field of view of the visual content, determining that the hand gesture satisfies a predetermined condition;
in response to determining that the hand gesture satisfies the predetermined condition, showing at least one icon on the one or more finger object on the hand object, wherein the at least one icon respectively corresponds to at least one system function; and
in response to determining that a first icon among the at least one icon is triggered, activating a first system function corresponding to the first icon.

14. The host according to claim 13, wherein the first icon is shown at a first finger part on the hand object, the hand gesture comprises a reference finger joint and a first finger joint corresponding to the first finger part, and the processor performs:
in response to determining that a distance between the reference finger joint and the first finger joint has been less than a distance threshold for a predetermine time length, determining that the first icon shown at the first finger part is triggered;
in response to determining that the distance between the reference finger joint and the first finger joint is less than the distance threshold, providing a notification for notifying an accumulated time of the distance being less than the distance threshold.

15. The host according to claim 14, wherein the reference finger joint corresponds to a reference finger part on the hand object, and the processor performs:
in response to determining that the distance between the reference finger joint and the first finger joint is less than the distance threshold, keeping the reference finger part and the first finger part together for a predetermined duration.

16. The host according to claim 13, wherein the processor further performs:
in response to determining that an application providing to the visual content is designed with at least one specific system function corresponding to the at least one icon, determining the at least one specific system function to be the at least one system function;
in response to determining that the application providing to the visual content is not designed with any specific system function corresponding to the at least one icon, determining at least one default system function of the host to be the at least one system function.

17. A non-transitory computer readable storage medium, the computer readable storage medium recording an executable computer program, the executable computer program being loaded by a host to perform steps of:
- tracking a hand gesture and accordingly rendering a hand object in a visual content, wherein the hand object comprises one or more finger object;
- in response to determining that a palm of the hand gesture is substantially facing a user and a wrist flexion angle of the hand gesture is within an angle range, determining that an orientation of the hand gesture is within a predetermined range;
- in response to determining that the orientation of the hand gesture is within the predetermined range and the hand object locates within a field of view of the visual content, determining that the hand gesture satisfies a predetermined condition;
- in response to determining that the hand gesture satisfies the predetermined condition, showing at least one icon on the one or more finger object on the hand object, wherein the at least one icon respectively corresponds to at least one system function; and
- in response to determining that a first icon among the at least one icon is triggered, activating a first system function corresponding to the first icon.

* * * * *